US010093369B2

(12) United States Patent
Hollo

(10) Patent No.: US 10,093,369 B2
(45) Date of Patent: Oct. 9, 2018

(54) ANTI-THEFT BICYCLE LOCKING DEVICE

(71) Applicant: Csaba Hollo, Budapest (HU)

(72) Inventor: Csaba Hollo, Budapest (HU)

(73) Assignee: INLOCK KFT., Budapest (HU)

( * ) Notice: Subject to any disclaimer, the term of this patent is extended or adjusted under 35 U.S.C. 154(b) by 0 days.

(21) Appl. No.: 15/513,343

(22) PCT Filed: Sep. 24, 2015

(86) PCT No.: PCT/HU2015/050008
§ 371 (c)(1),
(2) Date: Mar. 22, 2017

(87) PCT Pub. No.: WO2016/046579
PCT Pub. Date: Mar. 31, 2016

(65) Prior Publication Data
US 2017/0240232 A1 Aug. 24, 2017

(30) Foreign Application Priority Data

Sep. 26, 2014 (HU) ..................................... 1400455

(51) Int. Cl.
*B62H 5/00* (2006.01)
*B62J 1/08* (2006.01)
(Continued)

(52) U.S. Cl.
CPC .............. *B62H 5/006* (2013.01); *B62H 5/001* (2013.01); *B62J 1/08* (2013.01); *E05B 67/00* (2013.01);
(Continued)

(58) Field of Classification Search
CPC .......... E05B 71/00; E05B 67/00; E05B 73/00; E05B 69/00; E05B 67/003; B62H 5/006; B62H 5/001; B62J 1/08
(Continued)

(56) References Cited

U.S. PATENT DOCUMENTS 5,325,689 A * 7/1994 Warner .................. B62H 5/003
70/18
5,678,435 A * 10/1997 Hodson .................. B62H 5/003
70/233
(Continued)

FOREIGN PATENT DOCUMENTS

DE 3103784 A1 1/1982
DE 4336605 A1 5/1995
(Continued)

*Primary Examiner* — Suzanne L Barrett
(74) *Attorney, Agent, or Firm* — Handal & Morofski; Anthony Handal

(57) ABSTRACT

Anti-theft bicycle locking device, wherein the bicycle has a saddle column (4), a saddle (3) and a rear frame tube (2), the device has a foldable locking loop that can be wrapped around the bicycle and a stationary object, the loop comprises a plurality of loop portions of which each has a predetermined length, a first loop portion is constituted by the saddle column (4) being a hollow tube, and a second loop portion (8, 16, 20) that has an outer diameter smaller than the diameter of the saddle column (4) and has a first end slidably connected to and moving in the interior of the saddle column (4), a closure member (11, 17) in the remote end part of the saddle column (4) preventing the removal of the second loop portion (16, 20) from the saddle column (4), a lock (7) is attached to an upper portion of the saddle column (4) close to the saddle (3), and a lock part (9) is attached to a free end of the last portion of the loop, the lock part (9) can be fitted in and engaged by the lock (7), and said loop portions can be pushed to take a compressed state and pulled to form the loop, an in compressed state said loop portions except for the saddle column (4) are positioned in the hollow inner space of the saddle column (4) and the rear tube (2), and the loop comprises at least one further loop portion attached to the remote end of the second loop portion (8, 16, 20), and the loop has a minimum length (LL) in fully unfolded state
(Continued)

which is at least as long as the combined length of the rear frame tube (LFT) and twice the length of the saddle column (LSC), in equation: $LL \geq LFT + 2*LSC$.

6 Claims, 5 Drawing Sheets

(51) Int. Cl.
    *E05B 73/00*         (2006.01)
    *E05B 69/00*         (2006.01)
    *E05B 71/00*         (2006.01)
    *E05B 67/00*         (2006.01)

(52) U.S. Cl.
    CPC .............. *E05B 69/00* (2013.01); *E05B 71/00* (2013.01); *E05B 73/00* (2013.01)

(58) Field of Classification Search
    USPC ........................................ 70/233, 14, 18, 58
    See application file for complete search history.

(56) References Cited

U.S. PATENT DOCUMENTS 6,036,214 A * 3/2000 Ono ......................... B62H 1/02
                                                              280/288.4
2012/0312058 A1* 12/2012 Mendyk ................ B62H 5/006
                                                               70/233

FOREIGN PATENT DOCUMENTS

| DE | 20220513 U1 | 9/2003 |
| DE | 10215532 A1 | 10/2003 |
| GB | 2414218 A | 11/2005 |

\* cited by examiner

ANTI-THEFT BICYCLE LOCKING DEVICE

The invention relates to an anti-theft bicycle locking device built in the saddle column, which has a foldable or compressible loop that can be wrapped around a stationary object like a fence, pole or any stationary object where the bicycle should be left and locked in this wrapped position.

There are several different locking devices known which are built in the space available in the interior of the hollow saddle column. DE 4336605 A1 shows an example, in which a chain is built in the saddle column so that it extends out of the column and reaches till the inner, lower end of the rear tube of the frame. The positioning of a chain in a wider hollow space requires the use of additional buffer elements, otherwise, during cycling the inevitable vibration of the vehicle can cause disturbing noises as the metal chain abuts the metal tube around it. A further problem lies in the limited length of the chain, which is too short for convenient use, as it will be explained in detail at a later part of the present specification.

A further known device is described in DE 20220513 U1, which uses a metal cable inserted in a slidable way in the saddle column and which also extends in the hollow interior of the tube of the frame which holds the saddle column. The problems connected with such a device will be explained in detail in connection with FIG. 2, but in a nutshell, the described structure allows the use of a total length for the locking system which also is too short for everyday use.

A third design is described in GB 2414218 which uses a coiled cable wound to a diameter that fits in the hollows interior of the saddle column and in the hollow tube of the frame underneath. A cable which has the strength and rigidity required to provide an efficient anti-theft protection should have a certain minimum thickness and strength that limits the diameter of the coil in which it can be wound. The required strength and the need of being able to be positioned in the available diameter are mutually contradicting requirement, whereas as a third requirement, the minimum length of the cable is added. After repeated uses the coil will tend to expand, and it will be difficult to push the coil into the tubes after use.

It is worth mentioning a further locking device described in DE 10215532 A1, which is not inserted in the saddle column, but consist of plurality of flat steel bars pivotally connected to each other at their respective ends. At the two open ends conforming parts of a lock is arranged so that the two parts can be locked together. The lock can be released either by a key or a code combination. In unfolded state the bars can take the required form i.e. constituting a loop that connects the bicycle to a stationary post.

The object of the invention is to provide a locking device that can be conveniently positioned in the hollow interior of the saddle column and in the hollow continuation thereof of the rear tube of the frame, which can provide the required length, easy to be unfolded and returned again in the initial place, and which avoids generation of annoying noises during cycling.

For solving this object an anti-theft bicycle locking device has been provided, wherein the bicycle has a saddle column, a saddle held by the saddle column and a rear frame tube in which the saddle column can be fitted and its position can be adjusted and fixed. The device has a foldable locking loop that can be wrapped around the bicycle and a stationary object to prevent removal of the bicycle, the loop comprises a plurality of loop portions, of which each has a predetermined length, a first loop portion is constituted by the saddle column which is a hollow tube, and a second loop portion that has an outer diameter smaller than the diameter of the saddle column and has a first end slidably connected to and moving in the interior of the saddle column, a closure member in the remote end part of the saddle column preventing the removal of the second loop portion from the saddle column, a lock is attached to an upper portion of the saddle column close to the saddle, and a lock part is attached to a free end of the last portion of the loop, the lock part can be fitted in and engaged by the lock, and the loop portions can be pushed to take a compressed state and pulled to form the loop, an in compressed state the loop portions except for the saddle column are positioned in the hollow inner space of the saddle column and the rear tube, and according to the invention the loop comprises at least one further loop portion attached to the remote end of the second loop portion, and the loop has a minimum length LL in fully unfolded state which is at least as long as the combined length of the rear frame tube LFT and twice the length of the saddle column LSC, in equation: LL≥LFT+2*LSC.

With practical sizes of the saddle column and the rear frame tube this minimum length is around 1 m. The length of the loop portions can be increased until they have place in the combined hollow cavity of the saddle column and the rear frame part.

In a preferred first embodiment a support member is inserted in the interior of the saddle column that has an outer diameter that loosely fits to the inner diameter of the saddle column, and the support member has a downwardly narrowing portion, and the second loop portion is a tube with an upper end pivotally coupled to the narrowing portion of the support member, and the closure member has an opening allowing the passage of the pivotal connection, whereby when the tube is fully pulled out from the saddle column the tube can be freely bent at least by 90° degrees.

In this embodiment it is preferred if a flexible theft-protection cable is attached to the lower end of the tube, which has a smaller outer diameter than the inner diameter of the tube, and respective cooperating buffer members are arranged at the upper end of the cable and the lower end of the tube that allow insertion and pulling the cable in the tube but prevent the removal of the cable, the length of the cable is at least as long as the saddle column, and the lock part is fixed to the outer end of the cable.

In an alternative second embodiment the second loop portion is about as long as the saddle column or slightly shorter, and the further loop portions comprise a plurality of flat bars of a strong material which are connected to each other at their respective end portions by respective pivotal connections that allow angular displacement of the neighbouring bars with respect to each other, and the first bar is connected to the end of the second loop portion, in folded state the bars constitute a bar system that has a length slightly shorter than the free space in the rear frame part under the end of the saddle column, and their width and combined thickness is less than then free cross section of the rear frame tube in which the bar system can be inserted in a folded state, and the lock part is attached to the last one of the bars.

It is preferred if the second loop portion is a theft-protection flexible cable.

In a version of this second embodiment a support member is inserted in the interior of the saddle column that has an outer diameter that loosely fits in the inner diameter of the saddle column, and the support member has a downwardly narrowing portion, and the second loop portion is a tube with an upper end pivotally coupled to the narrowing portion of the support member, and the closure member has an opening allowing the passage of the pivotal connection, whereby when the tube is fully pulled out from the saddle column the tube can be freely bent at least by 90° degrees, and the tube is pivotally connected to the first bar of the bar system and the tube is at most slightly longer than the saddle column to leave space for the bar system when placed in compressed state in the rear frame portion.

In a third embodiment a support member is inserted in the interior of the saddle column that has an outer diameter that loosely fits in the inner diameter of the saddle column, and the support member has a downwardly narrowing portion, and the second loop portion is a tube with an upper end pivotally coupled to the narrowing portion of the support member, and the closure member has an opening allowing the passage of the pivotal connection, whereby when the tube is fully pulled out from the saddle column the tube can be freely bent at least by 90° degrees, and the further loop portions are respective further tubes that can be inserted in each-other in a telescopic manner and each connection between neighbouring ones of the tubes is a pivotal connection that in fully pulled state allows bending the connected tubes by at least 90° degrees, and in compressed state the total length of the telescope is shorter than the combined length of the saddle column and the free space under it.

The locking device provides a good solution for the tasks described, because in compressed state it can be hidden in the interior of the saddle column and the surrounding rear frame tube, but in unfolded state it has a sufficiently high length to allow wrapping a tree, a pole or any potential stationary objects to which the bicycle can be fixed. Furthermore, the structure is sufficiently dense to prevent the generation of unwanted vibrations when the bicycle is driven. In the present specification the term "bicycles" covers tandem cycles, trikes and all vehicles that have a saddle column and a longer tube around it.

The invention will now be described in connection with preferable embodiments thereof, in which reference will be made to the accompanying drawings. In the drawing.

Figure 1:
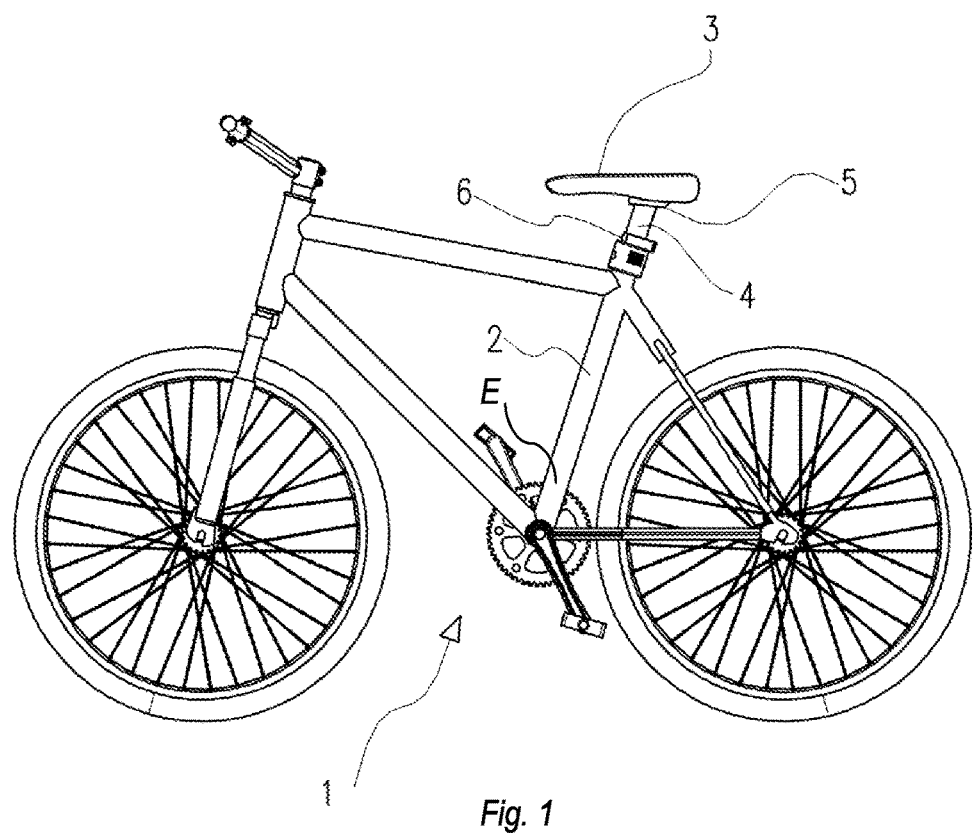
FIG. 1 shows a bicycle equipped with a locking device according to the invention.

In FIG. 1 a bicycle 1 is shown that has a conventional frame that has a triangular central part composed of three mutually welded tubes of which rear tube 2 has a hollow interior open at the upper end in which a hollow saddle column 4 can be inserted. A saddle 3 is attached to and fixed to the upper end of the saddle column 4 in a conventional way by means of standard attachment piece 5. The saddle column 4 can be fixed to the rear tube 2 by means of a quick fastener 6 in any position within an adjusting range so that the cyclist can adjust thereby the most convenient saddle height. The rear tube 2 has a hollow interior which terminates at inner end position E, since the space underneath is required for the connection of the other two tubes.

Figure 2:
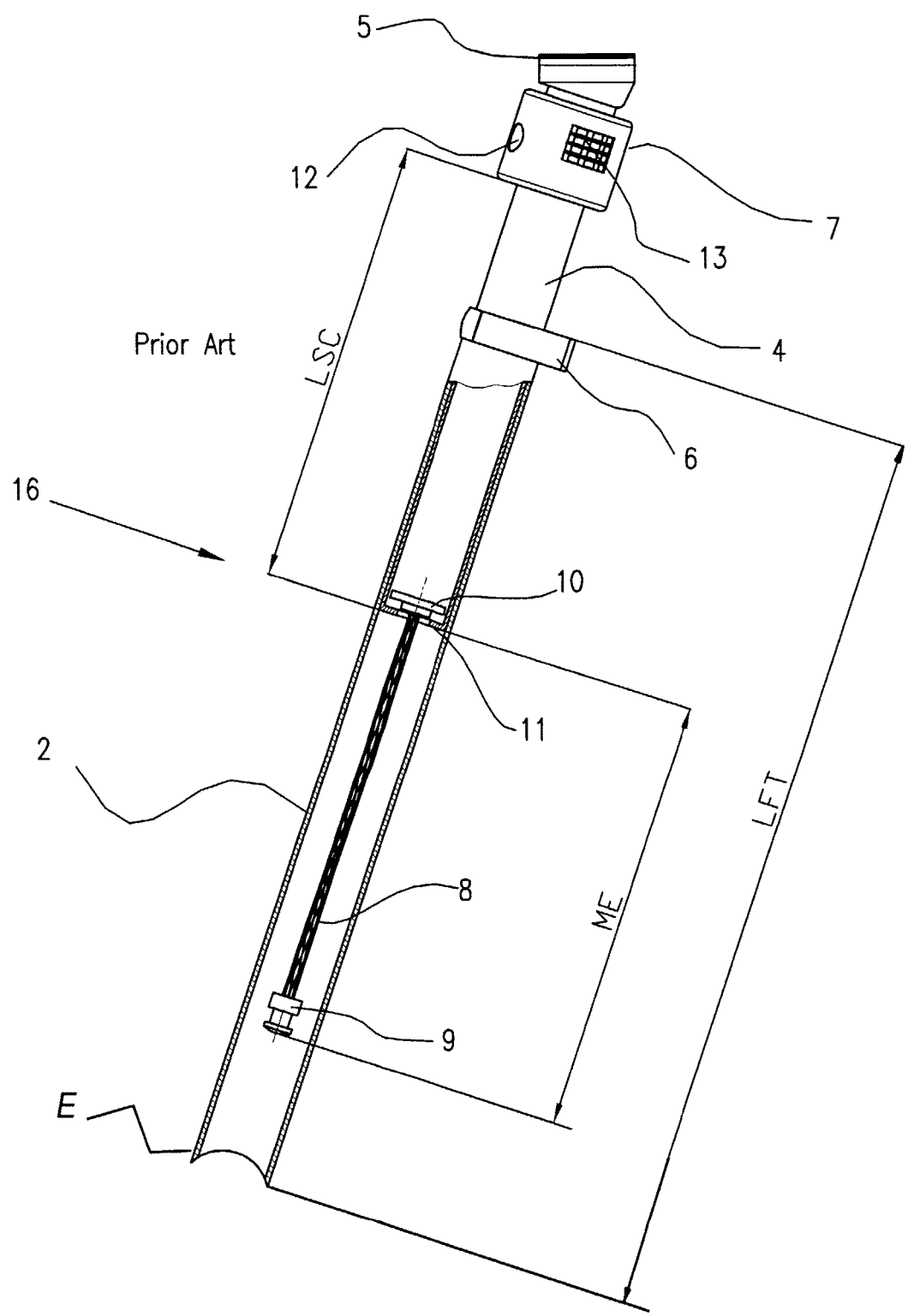
FIG. 2 shows a typical prior art model of a conventional locking device.

FIG. 2 shows a conventional locking device in an enlarged sectional view. A lock 7 is fixed to the saddle column 4 closely under the attachment piece 5 that can be a hollow cylinder arranged around the column 4 or can also be placed at the side of the column 4 and fixed thereto by a bolt. In the interior of the saddle column 7 a cable 8 is arranged so that it has a lower end to which a lock part 9 is fixed. The upper end of the cable is attached to buffer member 10 which is a shouldered cylindrical piece that has an outer diameter that loosely fits in the cylindrical interior of the saddle column 4. A closure member 11 is attached to the lower end of the saddle column 4 so that the presence of the closure member 11 prevents the cable 4 from being completely pulled out of saddle column 4. The cable 8 is covered by a flexible strong plastic protective tube and made by steel wires to provide the required strength.

The lock 7 has a second lock part 12 complementary in shape of the first locking part 9 which can be inserted therein and locked. The lock 7 can be opened by a key (not shown) or by means of a coded combination of numbers adjustable on numerical lock field 13.

Concerning the conditions of use of the device shown in FIG. 2 the length of the frame tube 2 LFT is an important size that extends between the open top of the tube 2 till the inner end position E of the hollow interior. A further important size is constituted by the length of the saddle column LSC.

As shown in FIG. 2 the cable 8 extends out from the lower end of the saddle column 4, and the space under this end changes as the height of the saddle is adjusted, however, the system must be functional even in the lowest height of the saddle, when the lower face of the lock 7 reaches the top end of the saddle column 4.

This free available size is the maximum extension ME of the cable 8 out of the saddle column, i.e.

$$ME = LFT - LSC. \quad (1)$$

The maximum length of the cable MCL is the sum of this maximum extension ME and the length of the saddle column LSC, i.e.

$$MCL = ME + LSC \quad (2)$$

because even when the cable 8 extends out of the column by the size ME, the buffer member 10 can slide till the end of the saddle column 4 i.e. till the closure member 11.

When for locking purposes the saddle 3 and the saddle column 4 are removed from the frame tube 2, then the maximum loop length MLL of the so obtained partially flexible elements between the lock 7 and the lock part 9 will be the sum of the length of the saddle column LSC and the maximum length of the cable MCL:

$$MLL = LSC + MCL, \quad (3)$$

Substituting the value of MCL from the equation (2), we obtain:

$$MLL = LSC + ME + LSC, \text{ i.e}$$

$$MLL = 2LSC + ME \quad (4)$$

Substituting now the value of ME from equation (1) in equation (4), we obtain:

$$MLL = 2LSC + LFT - LSC, \text{ i.e.}$$

$$MLL = LSC + LFT \quad (5)$$

In other words, the maximum length of the loop MLL that can be used for encircling a pole or a stationary object is the combined length of the frame tube LFT and the saddle column LSC. Of these two parts the saddle column 4 is a rigid linear part and only the extending cable 8 can be bent and returned to the lock.

In an average bicycle the length of the rear frame tube 2 is between about 400 and 500 mm, and the length of the saddle column 4 is between about 250 and 350 mm. If we take the longest of these values, then the maximum loop length will be around 850 mm.

It has been experienced, that for fixing a bicycle to a pole, a tree or to a stationary member, a total length of at least 1100 mm, but preferably over 1200 mm is required, especially because the saddle column 4 rigid and cannot be bent.

It is now apparent that prior art solutions, such as shown in FIG. 2 even if the maximum possible cable or chain length is chosen are not sufficiently long and comfortable to lock the bicycle to most of the potentially available stationary objects.

Figure 3:
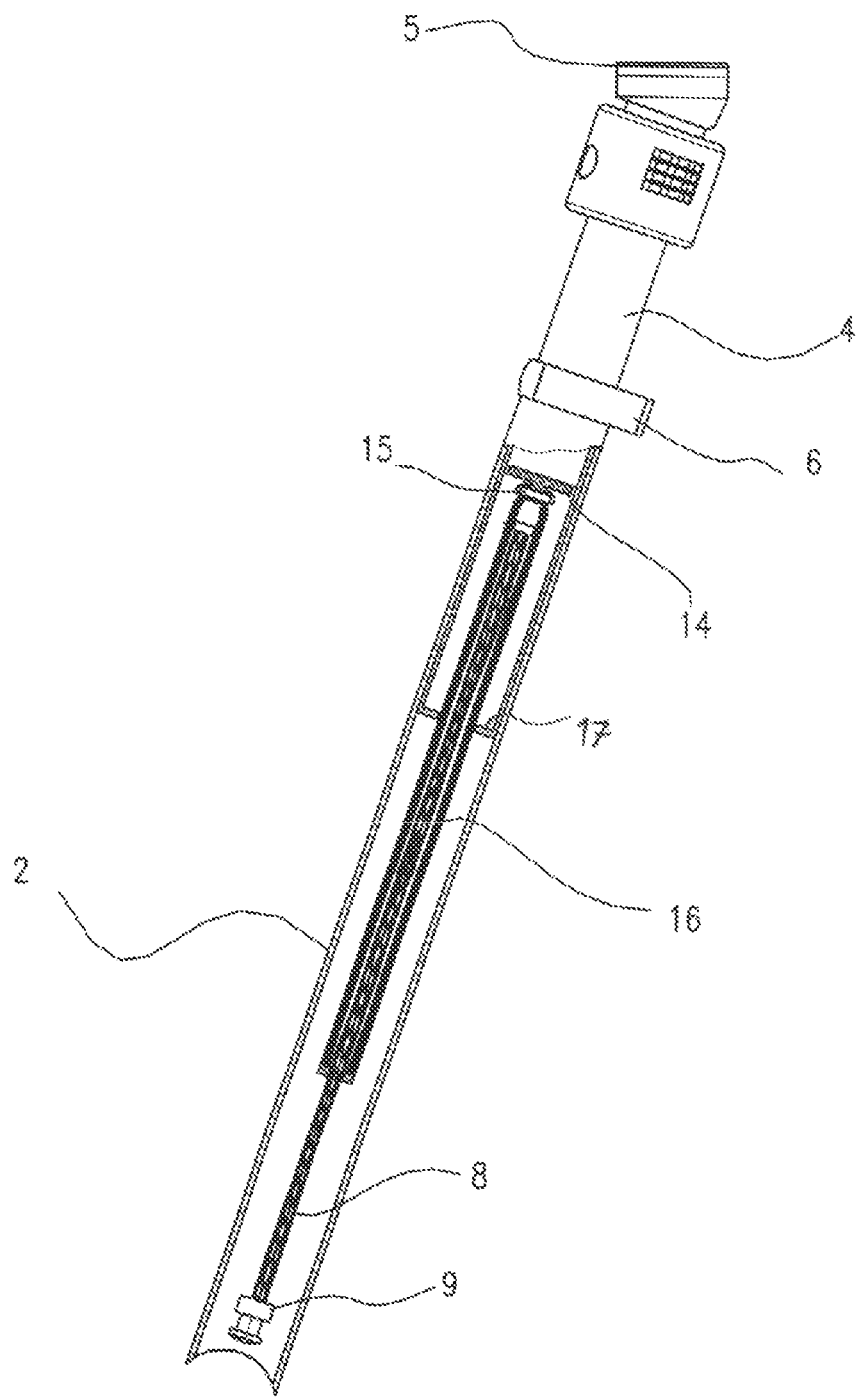
FIG. 3 shows a first embodiment of the present invention partially in section.

Reference is made now to FIG. 3 that shows a first embodiment of the locking device according to the invention. The saddle column 4 fits in a conventional way in the rear tube 2 of the bicycle frame. In the interior of the saddle column 4 if we proceed from the top towards the bottom, a sliding support member 14 is arranged that has a cylindrical upper part that loosely fits in the interior of the saddle column 4, and can slide therein. The support member 14 has a flattened lower part, and a pivot shaft 15 is lead therethrough to pivotally connect an intermediate sliding tube 16 with the support member 14. The upper end of the intermediate sliding tube 16 is also flattened so that the heads of the shaft have a smaller distance than the outer diameter of the tube 16. At the lower end of the saddle column 4 a hollow buffer 17 is arranged that prevents the support member 14 from escaping from the interior of the saddle column 4. The inner diameter of the hollow buffer 17 is slightly larger than the outer diameter of the intermediate tube 16, therefore the flattened part of the support member 14 can extend out from the hollow buffer, and in that position the intermediate shaft 16 can be pivotally turned with respect to the saddle column.

In the interior of the intermediate tube 16, similar to the previously described prior art embodiment the locking cable 8 is arranged, with the lock part 9 at its lower end. A retainer 18 at the lower end of the intermediate tube 8 prevents the cable 8 from escaping from the intermediate tube 16.

The intermediate tube 16 is made from a strong material, e.g. steel that resists most aggressive attacks when the bicycle is locked by this locking device.

The maximum length of the intermediate tube 16 and of the cable 8 (apart from the short length of their connection) are approximately the same as the maximum cable length MCL was in the previous embodiment, defined in equation (2), therefore the total loop length in this embodiment is the sum of the length of the saddle column LSC and twice the length LFT of the frame tube 2, i.e.

$$MLL = LSC + 2LFT \quad (6).$$

This length is by about the length of the frame tube 2 longer than in the previous embodiment by which the increase in loop length is at least about 350 mm, whereby the total loop length reaches the required value. Furthermore, by allowing for the intermediate tube 16 to be bent by the pivotal connection, the freedom of bending the loop will be higher.

Figure 4:
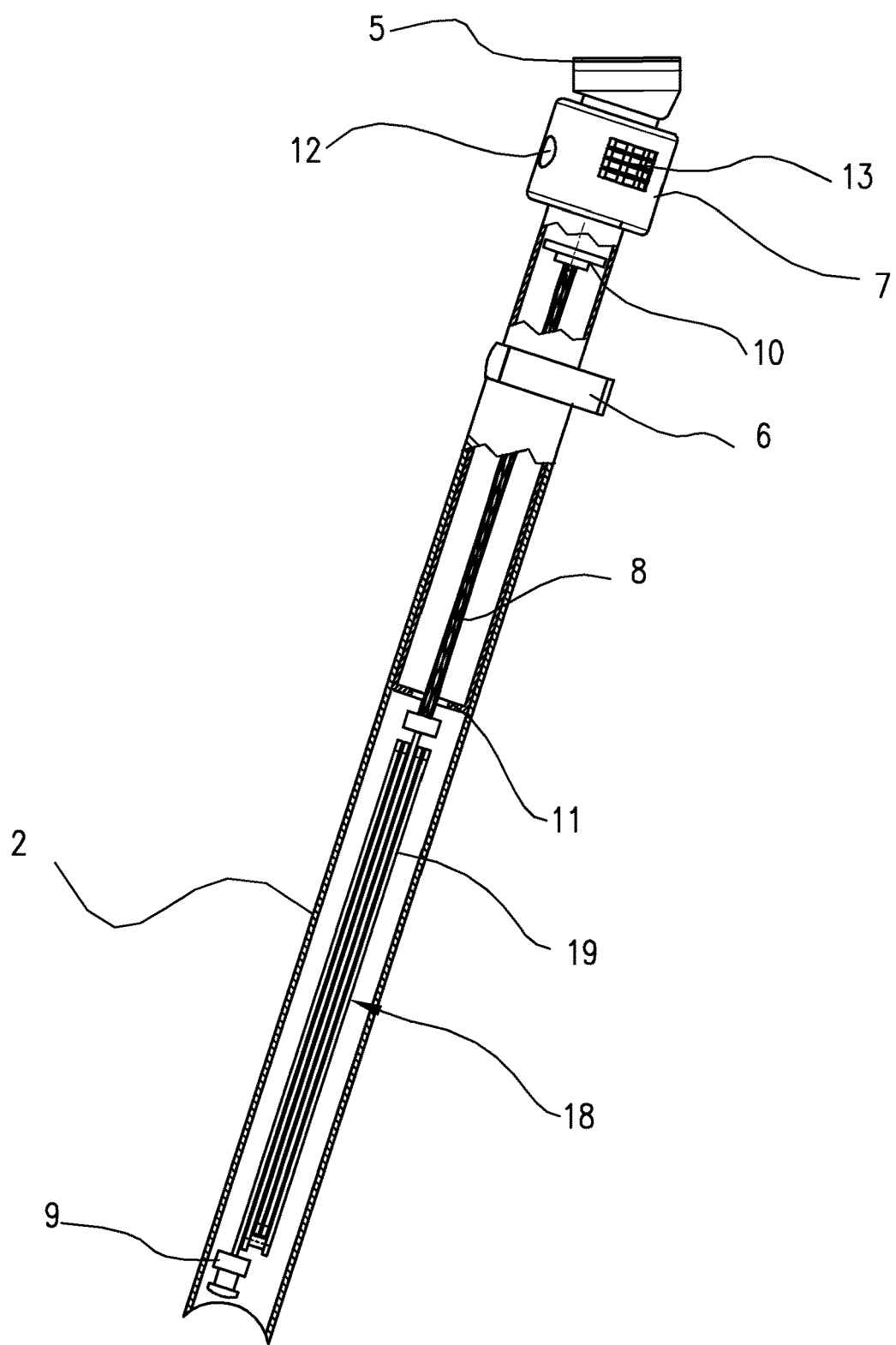
FIG. 4 shows a second embodiment, partially in section.

FIG. 4 shows a second embodiment of the locking device according to the invention. In this embodiment the cable 8 is arranged and guided in the interior of the saddle column 4, however, here the maximum length of the cable 8 is the length of the saddle column 4, because the free space (that has the length of ME (as defined earlier) is utilized to hold a pivotal bar system 18. In this embodiment the lock part 9 has been moved to the end of the pivotal bar system.

It can be apparent that in the interior of the saddle column 4 instead of the cable 8, the same intermediate tube could also be arranged as shown in FIG. 3, but in that case the connection of the lower end of the tube 16 and the bar system 18 should also be a pivotal connection. The bar system as such is similar to the system shown in the document DE 10215532, however, the length of the individual flat bars 19 should be less than the available space ME under the saddle column 4, and their size (width and thickness) should be chosen that the whole bar system 18 should be accommodated in the interior of the rear frame tube 2. With the approximate length data described, the length of the cable is equal with the length of the saddle column 4 i.e. between about 250 and 350 mm (middle value: 300 mm), and the medium length of the rear tube 2 is 450 mm, then the available space for the bar system 18 is 150 mm.

In this embodiment, the length of the saddle column LFC and the length of the cable 8 which is almost the same as the LFC value are parts of the total loop length. If we take the average value for LFC as 300 mm, the combined length of the saddle column and the cable will be 600 mm. If the required total loop length is chosen as 1200 mm, then it is sufficient if the total length of the bar system 18 is 1200−600=600 mm. The length of a bar 19 should be less than 150 mm, i.e. if we take 5 bars of each around 130 mm, then the total length of the bar system 18 will be: 5×130=650 mm, whereby a loop length longer than the required 1200 mm will be obtained. If the bars are made of steel, a thickness of around 3-4 mm will provide the required strength, thus five bars of at most 20 mm width can easily be placed in the frame tube 2 that has a standard inner diameter of 29.6 mm. A bar of 3.5 mm thickness and 18 mm width has sufficient rigidity for forming a theft-protection loop. Because of the reduced total length the number of the bars 19 is much less than in the above referred publication, where the whole loop was constituted by the bars.

An advantage of this embodiment is the high degree of flexibility, since each of the bars 19 are connected to the neighbouring one by a pivot connection therefore the loop can follow any required form.

In FIGS. 5 to 9 a third embodiment of the present locking device is shown. In this embodiment in the interior of the saddle column 4 a telescopic arrangement of three elements 20, 21, and 22 is placed. At least the upper two out of the three elements are tubular, while the narrowest last element 22 can also be a rod. All of the elements 20 to 22 have a pivotal connection to the next element below, and the presence of the joints does not prevent that the elements can be pushed into each other and take the interior of the saddle column 4 and they can protrude in the rear frame tube 2 till reaching its end. The lock part 9 is fixed to the free end of the last element 22. The pivotal connection is similar to the design of the support member 14, and the pivot shaft 15 as attached to the upper end of the intermediate tube shown in FIG. 3 at the first embodiment.

Figure 6:
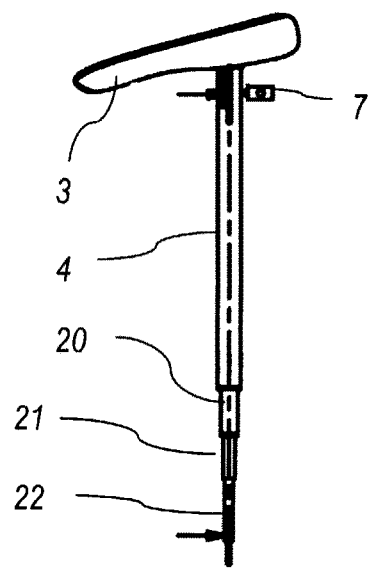
FIG. 6 shows this third embodiment with the saddle and saddle column, in folded state.
Figure 5:
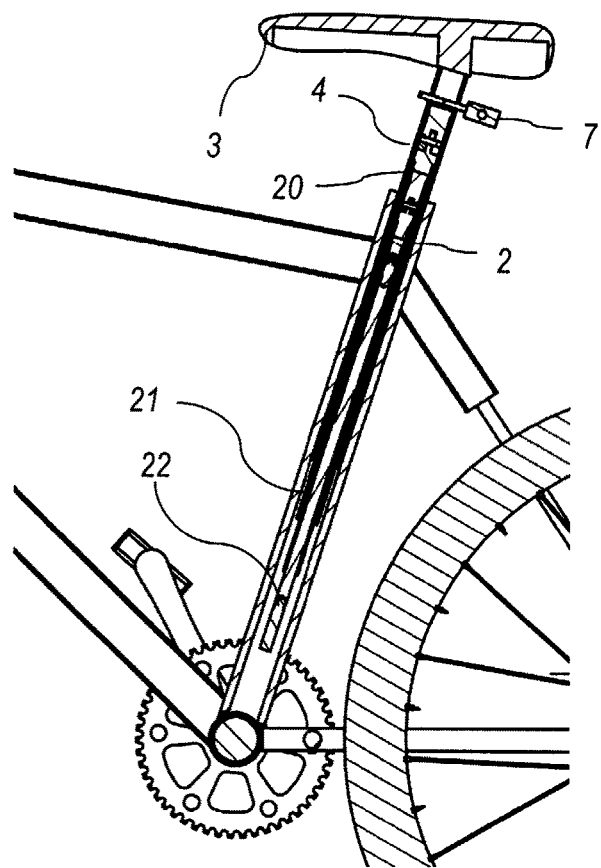
FIG. 5 shows the sectional view of a third embodiment.
Figure 7:
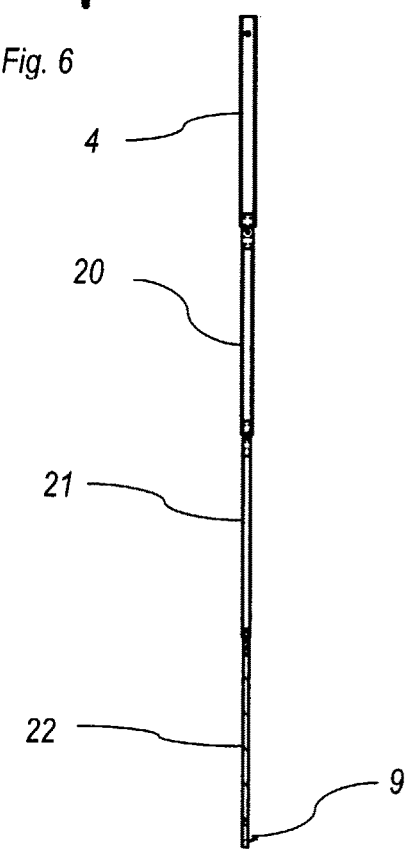
FIG. 7 shows the same device in unfolded state, without the saddle.
Figure 8:
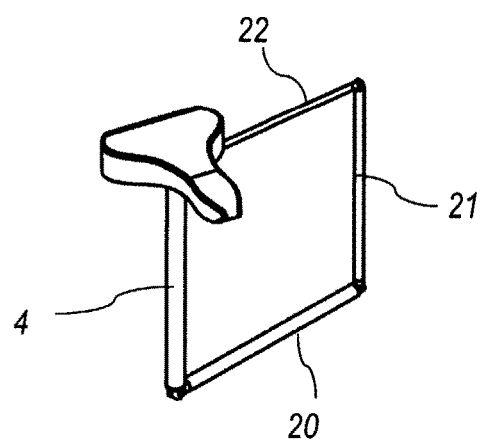
FIG. 8 is a sketch showing how this third embodiment can form a loop.

FIG. 6 shows the three elements 20 to 22 in compressed state when only the ends of the respective elements can be seen. FIG. 7 has the same scale as FIG. 6 and shows the elements 20 to 22 in fully expanded (pulled) state. At each connection the neighbouring elements can be turned with respect to each other by more than 90°, thus the three elements and the saddle column 4 can form a loop as shown in FIG. 8.

The length of the elements 20 to 22 is somewhat shorter than the length of the rear frame tube 2, therefore the maximum loop length MLL when using the previous designation is slightly shorter than:

$$MLL \leq LSC + 3*LFT \qquad (7)$$

In case the previously mentioned medium length values are taken, then MLL<300+3×400 mm=1500 mm.

From the point of view of easy handling it can be preferable, if the elements are equal with or not much longer than the saddle column 4.

Figure 9:
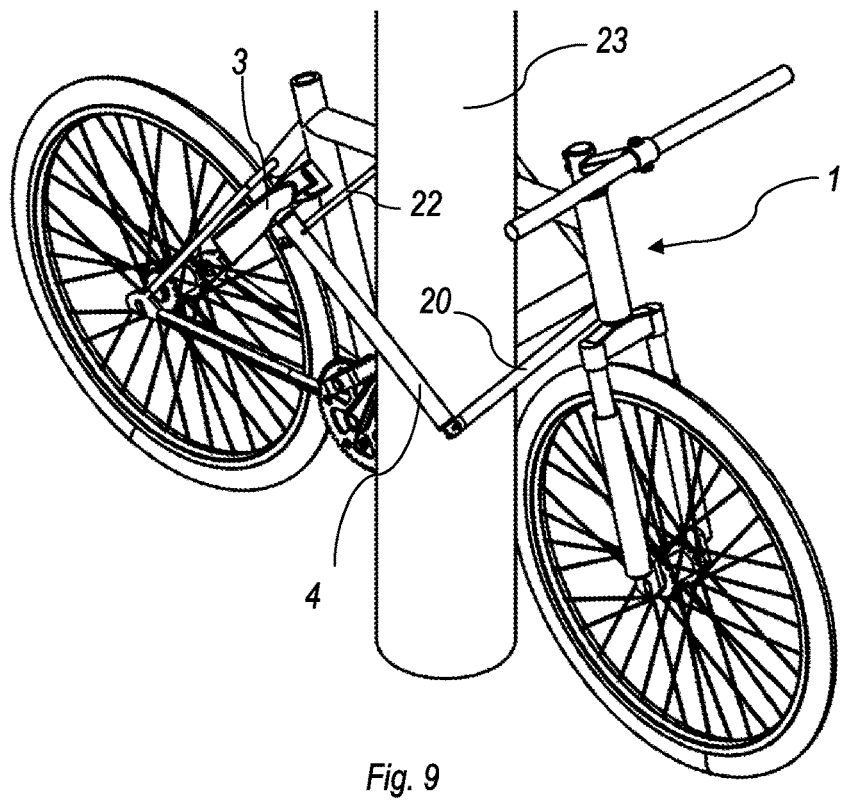
FIG. 9 shows an example how a bicycle can be locked by the third embodiment to a pole.

FIG. 9 shows an example how a stationary pole 23, e.g. a lamp-post can be used to prevent theft, as the loop surrounds the frame of the bicycle 1 and its last element 22 is inserted in the lock on the saddle column 4. After opening the lock, the elements 20 to 22 can be pushed back to take the position shown in FIG. 6 and inserted together with the saddle 3 and the saddle column 4 into the open rear frame tube 2.

The three embodiments shown were only preferred examples but the invention cannot be limited to any of these exemplary embodiments. The main advantage of the present locking device lies in its simplicity, and in the fact that it not only provides the required loop length but it has a high degree of flexibility for attachment to any stationary street object and to be positioned again into the invisible storage place in the interior of the rear frame tube 2.

The invention claimed is:

1. Anti-theft bicycle locking device, wherein the bicycle has a saddle column (4), a saddle (3) held by the saddle column (4) and a rear frame tube (2) in which the saddle column (4) can be fitted and its position can be adjusted and fixed, said device has a foldable locking loop that can be wrapped around the bicycle and a stationary object to prevent removal of the bicycle, the loop comprises a plurality of loop portions of which each has a predetermined length, a first loop portion is constituted by the saddle column (4) being a hollow tube, and a second loop portion (8, 16, 20) that has an outer diameter smaller than the diameter of the saddle column (4) and has a first end slidably connected to and moving in the interior of the saddle column (4), a closure member (11, 17) in the remote end part of the saddle column (4) preventing the removal of the second loop portion (16, 20) from the saddle column (4), a lock (7) is attached to an upper portion of the saddle column (4) close to the saddle (3), and a lock part (9) is attached to a free end of a last portion of the loop farthest away from the saddle column (4), the lock part (9) can be fitted in and engaged by the lock (7), and said loop portions can be pushed to take a compressed state and pulled to form the loop, and in compressed state said loop portions except for the saddle column (4) are positioned in the hollow inner space of the saddle column (4) and the rear tube (2), wherein the loop comprises at least one further loop portion attached to the remote end of the second loop portion (8, 16, 20), and the loop has a minimum length (LL) in fully unfolded state which is at least as long as the combined length of the rear frame tube (LFT) and twice the length of the saddle column (LSC), in equation: LL>LFT+2*LSC, and a support member (14) is inserted in the interior of the saddle column (4) that has an outer diameter that loosely fits in the inner diameter of the saddle column (4), and the support member (14) has a downwardly narrowing portion, and the second loop portion is a tube (16) with an upper end pivotally coupled to said narrowing portion of the support member (14), and the closure member (17) has an opening allowing the passage of the pivotal connection, whereby when the tube (16) is fully pulled out from the saddle column (4) the tube (16) can be freely bent at least by 90° degrees.

2. The bicycle locking device as claimed in claim 1, wherein a flexible theft-protection cable (8) is attached to the lower end of the tube (16), which has a smaller outer diameter than the inner diameter of the tube (16), and respective cooperating buffer members are arranged at the upper end of the cable (8) and the lower end of the tube (16) that allow insertion and pulling the cable (8) in the tube (16) but prevent the removal of the cable (8), the length of the cable (8) is at least as long as the saddle column (4), and the lock part (9) is fixed to the outer end of the cable (8).

3. The bicycle locking device as claimed in claim 1, wherein the second loop portion is about as long as the saddle column (4) or slightly shorter, and the further loop portions comprise a plurality of flat bars (19) of a strong material which are connected to each other at their respective end portions by respective pivotal connections that allow angular displacement of the neighbouring bars with respect to each other, and the first bar is connected to the end of the second loop portion, in folded state said bars (19) constitute a bar system (18) that has a length slightly shorter than the free space (ME) in the rear frame part (2) under the end of the saddle column (4) and their width and combined thickness is less than then free cross section of the rear frame tube (2) in which the bar system (18) can be inserted in a folded state, and the lock part (9) is attached to the last one of the bars (19).

4. The bicycle locking device as claimed in claim 3, wherein the second loop portion is a theft-protection flexible cable (8).

5. The bicycle locking device as claimed in claim 3, wherein the tube (16) is pivotally connected to the first bar of the bar system (18) and the tube (16) is at most slightly longer than the saddle column (4) to leave space for the bar system (18) when placed in compressed state in the rear frame portion (2).

6. The bicycle locking device as claimed in claim 1, wherein the further loop portions are respective further tubes (21, 22) that can be inserted in each-other in a telescopic manner and each connection between neighbouring ones of the tubes (20, 21, 22) is a pivotal connection that in fully pulled state allows bending the connected tubes (20, 21, 22) by at least 90° degrees, and in compressed state the total length of the telescope is shorter than the combined length of the saddle column (4) and the free space under it.

\* \* \* \* \*